US012691723B2

(12) United States Patent
Vata et al.

(10) Patent No.: US 12,691,723 B2
(45) Date of Patent: Jul. 28, 2026

(54) METHOD TO ADJUST THE TEMPERATURE OF AN ELEMENT OF A MOTOR VEHICLE TO BE INTERFACED WITH A PASSENGER OF THE MOTOR VEHICLE AND MOTOR VEHICLE COMPRISING SAID ELEMENT

(71) Applicant: FERRARI S.P.A., Modena (IT)

(72) Inventors: Klajdi Vata, Modena (IT); Enrico D'Angelo, Modena (IT)

(73) Assignee: FERRARI S.P.A., Modena (IT)

( * ) Notice: Subject to any disclaimer, the term of this patent is extended or adjusted under 35 U.S.C. 154(b) by 389 days.

(21) Appl. No.: 18/490,324

(22) Filed: Oct. 19, 2023

(65) Prior Publication Data

US 2024/0181836 A1 Jun. 6, 2024

(30) Foreign Application Priority Data

Oct. 24, 2022 (IT) ........................ 102022000021864

(51) Int. Cl.
*B60H 1/00* (2006.01)
*B60H 1/22* (2006.01)

(52) U.S. Cl.
CPC ..... *B60H 1/00285* (2013.01); *B60H 1/00292* (2013.01)

(58) Field of Classification Search
CPC ............ B60H 1/00271; B60H 1/00285; B60H 1/00292; B60H 1/0065; B60H 1/00735; B60H 1/00792; B60H 1/2218
See application file for complete search history.

(56) References Cited

U.S. PATENT DOCUMENTS 8,839,632 B2 9/2014 Goenka et al.
2006/0042788 A1 * 3/2006 Naruse ............... B60H 1/00985
62/239

(Continued)

FOREIGN PATENT DOCUMENTS

EP 3778271 A1 * 2/2021 ......... B60H 1/00285
JP 2005329929 A * 12/2005
KR 101837399 B1 3/2018

OTHER PUBLICATIONS

JP2005329929 and translation (Year: 2005).*

(Continued)

*Primary Examiner* — Steven S Anderson, II
(74) *Attorney, Agent, or Firm* — CANTOR COLBURN LLP

(57) ABSTRACT

A method to adjust a first temperature of an element of a motor vehicle to be interfaced with a passenger of the motor vehicle, comprising the steps of i) adjusting a second temperature on the inside of the motor vehicle based on a second temperature currently requested to an adjustment system for said second temperature; ii) detecting a third external temperature on the outside of a passenger compartment of the motor vehicle; iii) detecting a fourth current temperature on the inside of the passenger compartment of the motor vehicle; iv) detecting a current value of the first temperature of the element; v) processing a fifth temperature based on said first, fourth and fifth temperature; and vi) exchanging a quantity of heat with the element so as to adjust the first temperature; the quantity of heat depends on the fifth temperature.

14 Claims, 4 Drawing Sheets

(56)         References Cited

U.S. PATENT DOCUMENTS

2009/0000778 A1      1/2009  Nathan et al.
2012/0234932 A1*     9/2012  Okamoto ............ B60H 1/2218
                                                237/2 R

OTHER PUBLICATIONS

Italian Search Report for Application No. 102022000021864, Filing Date: Oct. 24, 2022; Date of Mailing: May 4, 2023, 7 pages.

* cited by examiner

METHOD TO ADJUST THE TEMPERATURE OF AN ELEMENT OF A MOTOR VEHICLE TO BE INTERFACED WITH A PASSENGER OF THE MOTOR VEHICLE AND MOTOR VEHICLE COMPRISING SAID ELEMENT

CROSS-REFERENCE TO RELATED APPLICATIONS

This patent application claims priority from Italian patent application no. 102022000021864 filed on Oct. 24, 2022, the entire disclosure of which is incorporated herein by reference.

TECHNICAL FIELD

The invention relates to a method to adjust the temperature of an element of a motor vehicle to be interfaced with a passenger of the motor vehicle.

The invention also relates to a motor vehicle comprising said element.

BACKGROUND

Motor vehicles are known, which basically comprise:
a passenger compartment defining a body;
a plurality of elements to be interfaced with the passengers of the motor vehicle and arranged in the motor vehicle; and
a conditioning system for the temperature on the inside of the motor vehicle, which can be operated by the passengers of the motor vehicle.

The term "element to be interfaced" indicates any component of the motor vehicle accommodated inside the passenger compartment and designed to come into contact—and, hence, exchange heat—with the body or with body portions of the passengers of the motor vehicle.

Typical examples of the aforesaid interfaceable elements are the seat, the steering wheel, the central armrest or the safety belts.

The temperature conditioning system comprises, in turn:
an interface, which can be operated to enter a requested value for the temperature inside the passenger compartment; and
a plurality of air vents designed to let air into the passenger compartment at a temperature that is such as to allow the temperature inside the passenger compartment to reach the requested temperature.

Following the activation of the conditioning system, the interfaceable elements do not immediately reach the requested temperature.

On the contrary, the change in the temperature of the interfaceable elements largely depends on the exchange of heat with the body of the passenger.

For example, in case of particularly high external temperatures, the passenger, who has a lower temperature, absorbs heat from the seat, which remains at a higher temperature for a given amount of time.

This heat exchange inevitably leads to a feeling of heat and, consequently, of discomfort for the passengers of the motor vehicle.

In order to mitigate this uncomfortable feeling, manufacturers suggested to heat the aforesaid interfaceable elements by means of electrical resistances, which can selectively be activated, or to cool them by means of fans.

Nevertheless, the activation of said electrical resistances and fans is not linked in any way to the thermal feelings perceived by the passengers of the motor vehicle.

As a consequence, there is large room for improvement in terms of the thermal comfort perceived by the passenger of the motor vehicle.

Therefore, the automotive industry needs to improve the thermal comfort perceived by the passengers of the motor vehicle in a simple, quick and automatic manner.

Furthermore, the automotive industry needs to reduce the energy consumptions associated with the air conditioning of the motor vehicle, though without jeopardizing the thermal comfort perceived by the passengers of the motor vehicle.

SUMMARY

The object of the invention is to provide a motor vehicle, which is capable of fulfilling at least one of the needs discussed above.

The aforesaid object is reached by the invention, as it relates to a method to adjust the temperature of an element of a motor vehicle to be interfaced with a passenger of the motor vehicle according to claim 1.

The invention also relates to a motor vehicle as set forth in claim 7.

BRIEF DESCRIPTION OF THE DRAWINGS

The invention will be best understood upon perusal of the following detailed description of a preferred embodiment, which is provided by way of non-limiting example, with reference to the accompanying drawings, wherein.

DESCRIPTION OF EMBODIMENTS

Figure 1:
FIG. 1 is a perspective view of a motor vehicle according to the invention, with parts removed for greater clarity.

With reference to FIG. 1, the drawing shows a motor vehicle basically comprising a body 2, a passenger compartment 3, a steering wheel 15c and a plurality of seats 15a, 15b accommodated in the passenger compartment 3.

Hereinafter, expressions such as "at the top", "at the bottom", "at the front", "at the back", "left", "right" and others similar to them are used with reference to a normal travel direction of the motor vehicle 1.

The motor vehicle 1 further comprises:
a conditioning system 7, which can be controlled to adjust the temperature inside the passenger compartment 3, through the introduction of air at a temperature that is higher or lower than the temperature $T_{cabina}$ inside the passenger compartment 3 through a plurality of air vents 9 arranged in the passenger compartment 3; and
a control interface 8 of the conditioning system 7, which can be operated to request a desired temperature $T_{richiesta}$ inside the passenger compartment 3.

The motor vehicle 1 further comprises:

a sensor 10 designed to detect the temperature $T_{out}$ on the outside of the motor vehicle 1; and a sensor 14 designed to detect the temperature $T_{cabina}$ on the inside of the passenger compartment 3.

The motor vehicle 1 further comprises a plurality of elements to be interfaced with a passenger of the motor vehicle 1.

The term "to be interfaced" means, for the purposes of this description, that the elements are in contact and, hence, exchange heat with the passenger, when he/she is inside the passenger compartment 1.

The interfaceable elements each have a respective temperature indicated as $T_{utenza}$.

Non-limiting examples of the interfaceable elements are the seats 15a, 15b and the steering wheel 15c, to which reference will be made in the description below without losing generality.

Further example of interfaceable elements are the safety belts or the central armrest or the mats or the door panels of the motor vehicle 1.

In particular, the seat 15a is arranged at the front, opposite the steering wheel 15c and the seats 15b are the remaining front and rear seats of the motor vehicle 1.

The motor vehicle 1 further comprises:

a control unit 20;

an adjustment system 23 controlled by the control unit 20 to adjust the temperatures $T_{utenza}$ of the respective seats 15a, 15b; and an adjustment system 24 controlled by the control unit 20 to adjust the temperature $T_{utenza}$ of the steering wheel 15c.

The motor vehicle 1 advantageously comprises:

a plurality of sensors 50, 51 configured to detect the current temperatures $T_{utenza}$ of the respective seats 15a, 15b and of the steering wheel 15c; and a control unit 20 programmed to:

process, for each seat 15a, 15b and steering wheel 15c, a temperature $T_{prev}$ based on the temperatures $T_{utenza}$; $T_{cabina}$; $T_{richiesta}$; and generate, based on the temperature $T_{prev}$ and for each seat 15a, 15b and steering wheel 15c, a respective command for the systems 23, 24 so as to adjust the temperature $T_{utenza}$ of the seat 15a, 15b and of the steering wheel 15c.

More in detail, the control unit 20 is programmed to process the temperature $T_{prev}$ also based on the second temperature $T_{out}$.

More in particular, the control unit 20 is programmed to process the temperature $T_{prev}$ based on the following formula $$Tprev = \alpha * Tutenza + \beta * Tcabina + \gamma * (TRIF - Trichiesta),$$

wherein:

$T_{RIF}$ is a temperature that can selectively be set by the passenger;

$\alpha$ and $\beta$ are coefficients that depend on the temperature $T_{out}$ and are independent of the temperatures $T_{utenza}$; $T_{cabina}$; $T_{richiesta}$; and $\gamma$ is a constant coefficient.

In the specific case shown herein, $T_{rif}$ is 22 degrees Celsius.

Figure 3:
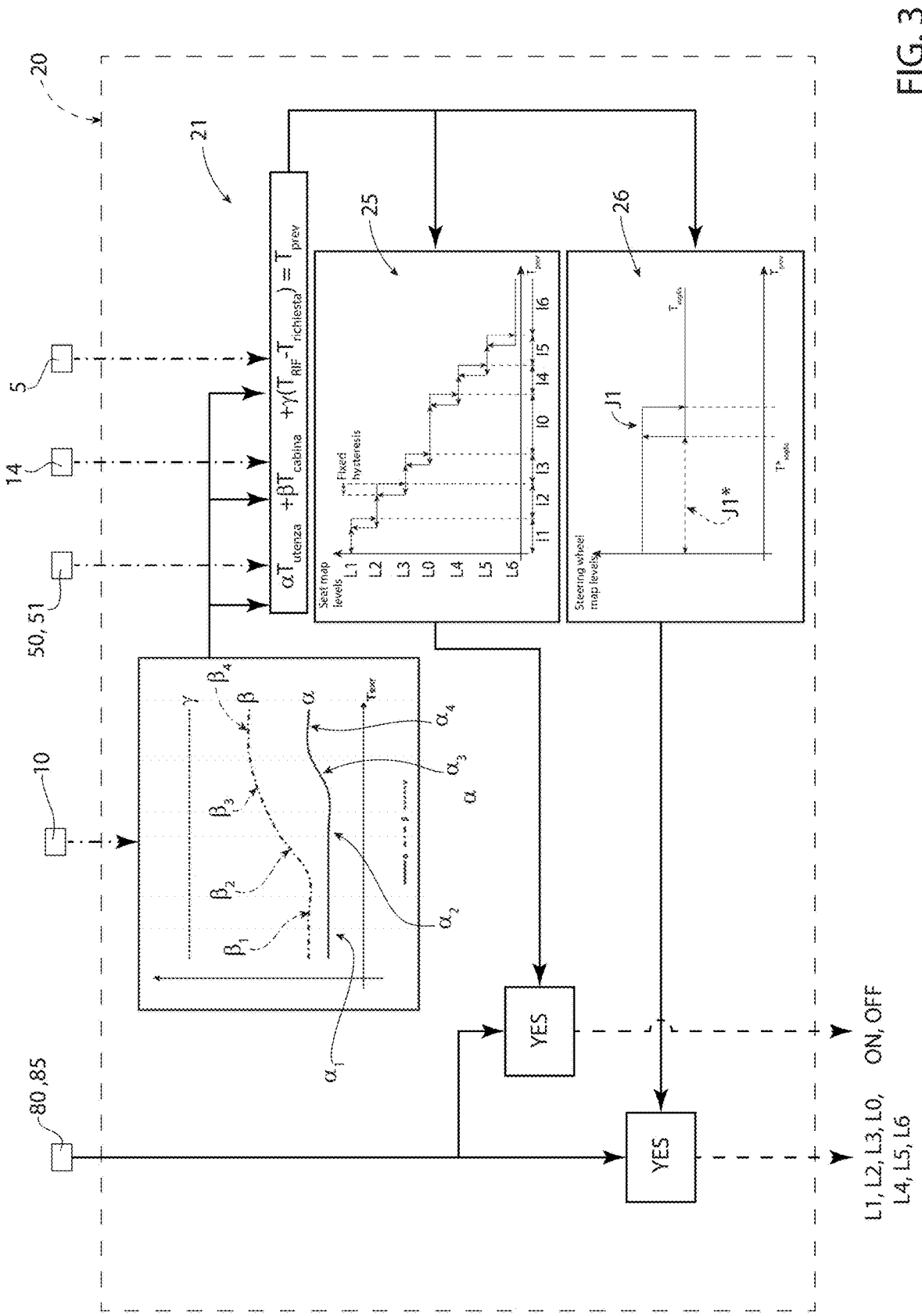
FIG. 3 schematically shows a control unit programmed to adjust the temperature of the interfaceable elements of FIG. 2.

The parameters $\alpha$, $\beta$ and $\gamma$ and their development relative to the temperature $T_{out}$ are stored in a storing stage 21 of the control unit 20 (FIG. 3).

As shown in FIG. 3, for each temperature value $T_{out}$, the coefficient $\alpha$ is smaller than the coefficient $\beta$ and the coefficient $\beta$ is smaller than the coefficient $\gamma$.

With reference to the temperature $T_{out}$ and to the increase in the temperature $T_{out}$, the development of the coefficient $\beta$ comprises: —a decreasing segment $\beta1$ with a concavity facing downwards;

an increasing segment $\beta2$ with a concavity facing upwards;

an increasing segment $\beta3$ with a concavity facing downwards; and a decreasing segment $\beta4$ with a concavity facing downwards.

With reference to the temperature $T_{out}$ and to the increase in the temperature $T_{out}$, the development of the coefficient $\alpha$ comprises:

a constant segment $\alpha1$;

a decreasing segment $\alpha2$ with a concavity facing downwards;

an increasing segment $\alpha3$ with greater values than the values of the segment $\alpha1$ and with a concavity facing upwards; and a segment $\alpha4$ increasing at first and then decreasing, with greater values than the values of the segment $\alpha1$ and with a concavity facing downwards.

The coefficient $\beta$ is greater than the coefficient $\alpha$, given the same temperature $T_{out}$.

Figure 2:
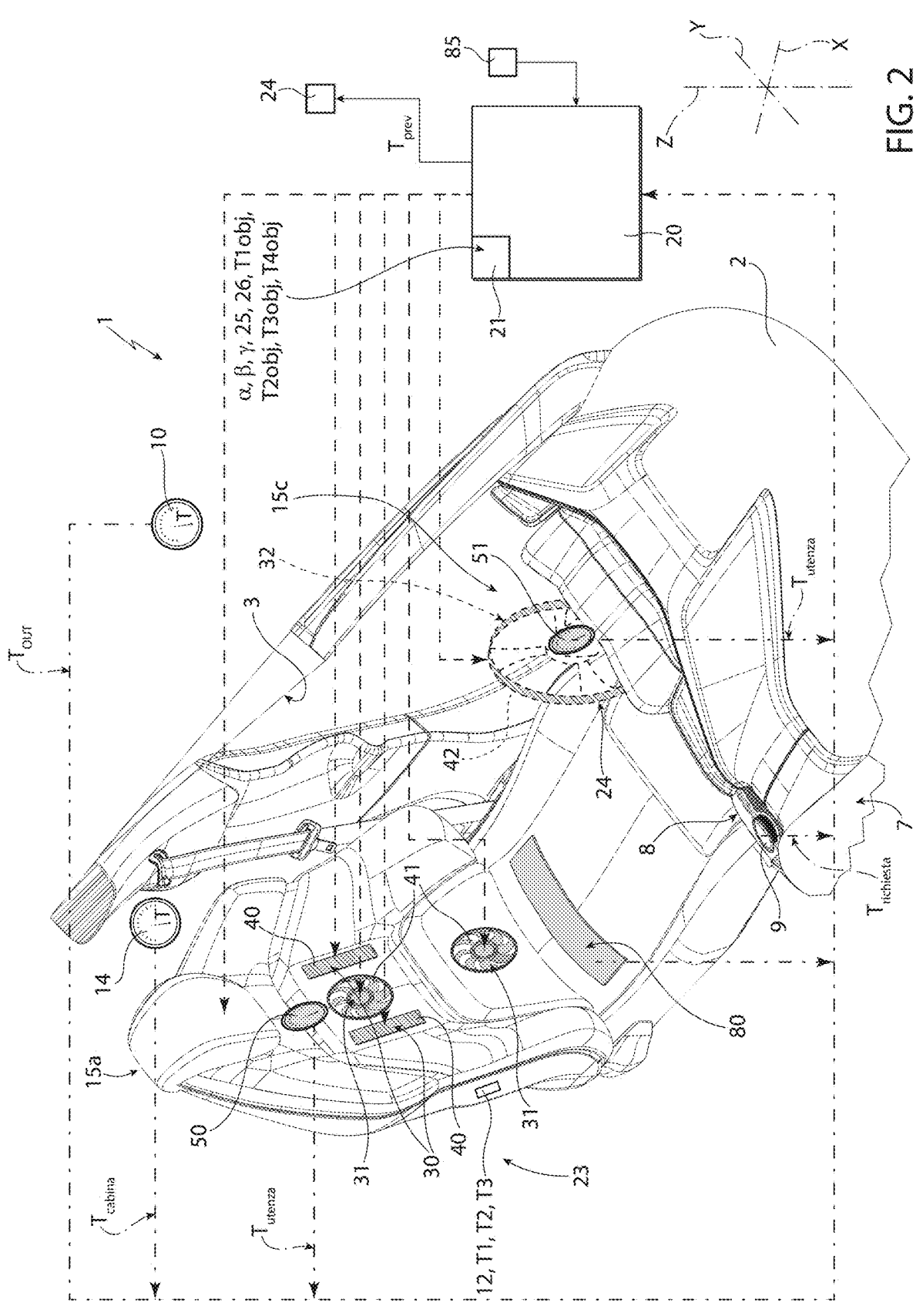
FIG. 2 schematically shows a front portion of a passenger compartment of the motor vehicle of FIG. 1, which accommodates some elements to be interfaced with the passengers of the motor vehicle, for example a seat and a steering wheel, with parts removed for greater clarity.

More in detail, the system 23 comprises, for each seat 15a, 15b (FIG. 2):

a plurality of heating elements 30, for example electrical resistances 40, which are housed inside the seats 15a, 15b and can be operated by the control unit 20 depending on the temperature $T_{prev}$ in order to generate a heat power suited to heat the seats 15a, 15b; and a plurality of cooling elements 31, for example fans 41, which are housed inside the seats 15a, 15b and can be operated by the control unit 20 depending on the temperature $T_{prev}$ in order to convey a fresh air flow into the seats 15a, 15b and cool the seats 15a, 15b.

The system 23 further comprises an interface 12 (only schematically shown in FIG. 2), which can manually be selected to control the heating elements 30 independently of the control unit 20.

The interface 12 is operatively connected to the heating elements 30 and is configured so as to set a plurality of—in the specific case shown herein, three—progressively increasing desired temperatures T1, T2, T3 of the seat 15a, 15b.

In particular, when the temperature T1, T2, T3 is selected on the interface 12, the heating elements 30 are operated so as to cause the temperature $T_{utenza}$ of the seat 15a, 15b, 15c to reach the respective desired temperature value T1, T2, T3 of the seat 15a, 15b.

Figure 4:
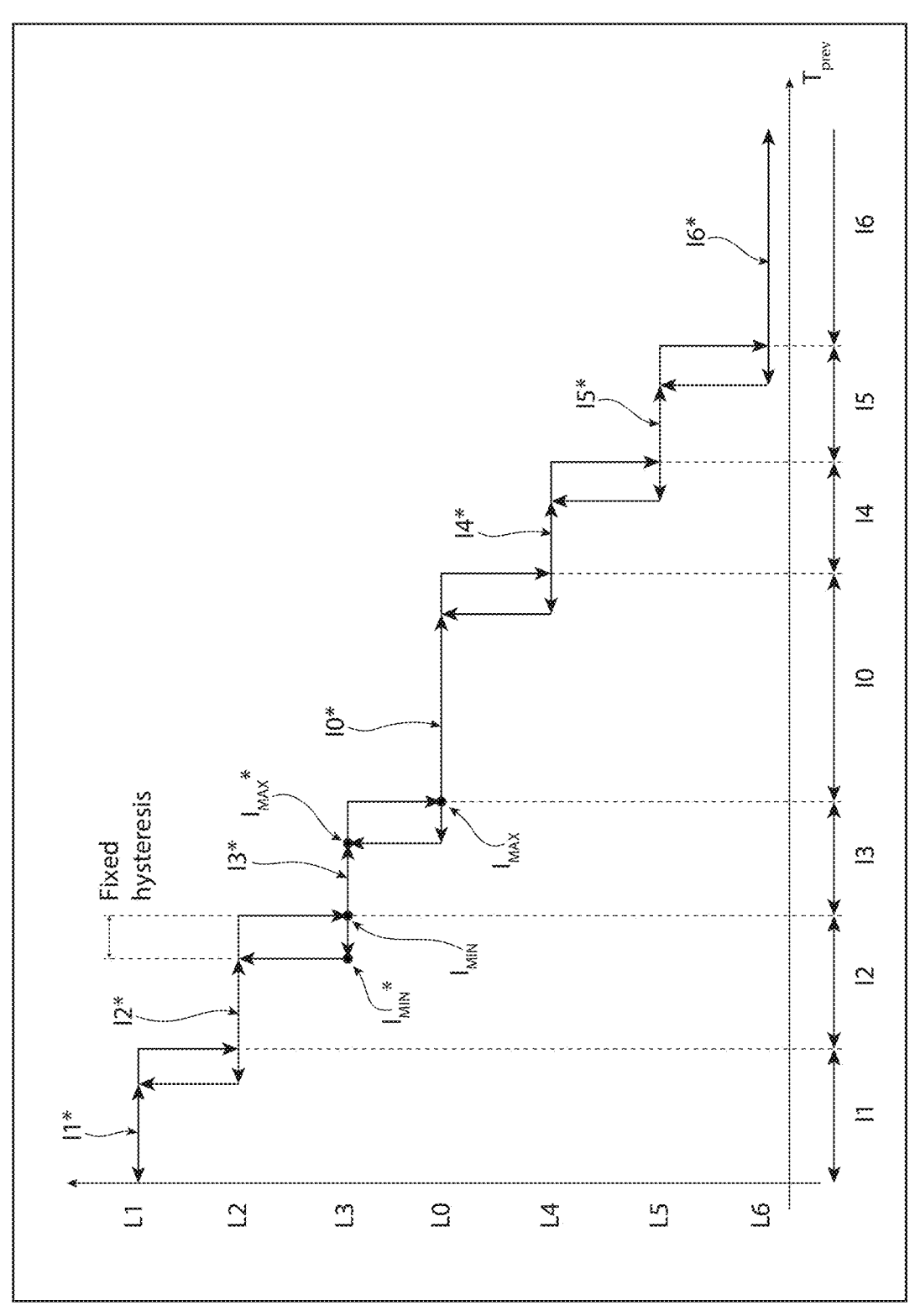
FIG. 4 schematically shows, on a much larger scale, some details of FIG. 3.

In the specific case shown in FIGS. 3 and 4, the control unit 20 is programmed to set the heating elements 30 to a plurality of—in the specific case shown herein, three—discrete operating levels L1, L2, L3.

Each level L1, L2, L3 corresponds to a respective progressively increasing objective temperature T1obj, T2obj, T3obj of the seat 15a, 15b.

More precisely, the control unit 20 operates the electrical resistances 40 of the heating elements 30 with a temperature and for an amount of time that are such as to cause the temperature $T_{utenza}$ of the seat 15a, 15b to be the same as the corresponding objective temperature T1obj, T2obj, T3obj.

The control unit 20 is further programmed to receive the current value of the temperature $T_{utenza}$ of the seat 15a, 15b and to activate/deactivate the electrical resistances 40 of the heating elements 30 in feedback mode so as to cause the current value of the temperature T utenza to be the same as the desired temperature T1obj, T2obj, T3obj.

In particular, the objective temperatures T1obj, T2obj, T3obj associated with the levels L1, L2, L3 are equal to the respective temperatures T1, T2, T3 that can be selected by means of the interface 12.

Similarly, the control unit 20 is programmed to set the cooling elements 31 to a plurality of—in the specific case shown herein, three—discrete operating levels L4, L5, L6.

In other words, the control unit 20 is programmed to cause the fans 41 of the cooling elements 31 to reach respective levels of angular speed ω that are different from one another, so as to remove quantities of heat power from the respective seat 15a, 15b.

In the specific case shown herein, the levels L1, L3 correspond to the maximum and minimum values, respectively, of the objective temperature T1obj, T3obj of the seat 15a, 15b.

The level L2 corresponds to an intermediate value of the objective temperature T2obj of the seat 15a, 15b.

The levels L4, L6 correspond to the maximum and minimum values, respectively, of the angular speed ω of the fans 41 and, hence, to respective maximum and minimum values of the heat power absorbed by the cooling elements 31 from the respective seat 15a, 15b.

The level L5 corresponds to an intermediate value, between the values associated with the levels L4, L6, of the angular speed ω of the fans 41 and, hence, to a respective intermediate value of the heat power absorbed by the cooling elements 31 from the respective seat 15a, 15b.

The control unit 20 is further programmed to keep the system 23 at a level L0, in which the heating elements 30 and the cooling elements 31 are deactivated and, as a consequence, do not exchange heat power with the relative seat 15a, 15b.

When the system 23 is at the level L0, the temperature $T_{utenza}$ of the seat 15a, 15b corresponds to a condition of comfort of the passenger of the seat 15a, 15b.

To sum up, from a condition of maximum heating to a condition of maximum cooling of the respective seat 15a, 15b, the control unit progressively sets the system 23 to the levels L1, L2, L3, L4, L5, L6.

The system 24 comprises a plurality of heating elements 32, for example electrical resistances 42, which are housed inside the steering wheel 15c and can be operated by the control unit 20 depending on the temperature $T_{prev}$ in order to generate a heat flow suited to heat the steering wheel 15c.

To sum up, the control unit 20 is programmed to set the system 24, depending on the temperature $T_{prev}$:

to an ON condition, in which the heating elements 32 are activated; or to an OFF condition, in which the heating elements 32 are deactivated.

The storing stage 21 stores a map 25.

The objective temperatures T1obj, T2obj, T3obj, T1obj are also stored in the storing stage 21.

The map 25 associates:

closed ranges I1, I2, I3, I0, I4, I5 and an open range I6 of values of the temperature $T_{prev}$ with respective operating levels L1, L2, L3, L0, L4, L5, L6 of the system 23, in case of progressively increasing values of the temperature value $T_{prev}$; and closed ranged I1*, I2*, I3*, I0*, I4*, I5* and an open range I6* of values of the temperature $T_{prev}$ with respective operating levels L1, L2, L3, L0, L4, L5, L6 of the system 23, in case of progressively increasing values of the temperature $T_{prev}$.

The ranges I1, I2, I3, I0, I4, I5, I6 corresponding to respective levels L1, L2, L3, L0, L4, L5, L6 are associated with the ranges I1*, I2*, I3*, I0*, I4*, I5*, I6* corresponding to the same levels L1, L2, L3, L0, L4, L5, L6.

In particular, each range I1, I2, I3, I0, I4, I5 is delimited by respective maximum and minimum values $I_{MIN}$ and $I_{MAX}$ of the temperature $T_{prev}$ (FIG. 4).

Similarly, each range I1*, I2*, I3*, I0*, I4*, I5* is delimited by respective maximum and minimum values $I^*_{MIN}$ and $I^*_{MAX}$ of the temperature $T_{prev}$.

The maximum value $I_{MAX}$; $I^*_{MAX}$ of each range I1, I2, I3, I4, I0, I5; I1*, I2*, I3*, I0*, I4*, I5* corresponds to the minimum value $I_{MIN}$, $I^*_{MIN}$ of the relative range I2, I3, I0, I4, I5, I6; I2*, I3*, I0*, I4*, I5*, I6* associated with immediately higher temperature values $T_{prev}$.

The ranges I6, I6* are delimited by the respective minimum values $I_{MIN}$, $I^*_{MIN}$ of the temperature $T_{prev}$ and are open at the top, namely they reach values of the temperature $T_{prev}$ that are greater than the respective minimum values $I_{MIN}$, $I^*_{MIN}$.

In particular, the ranges I1, I2, I3, I4, I0, I5, I6 have the same width, which is the same as the width of the ranges I1*, I2*, I3*, I0*, I4*, I5*, I6*.

In other words, the difference between the maximum value $I_{MAX}$ and the minimum value $I_{MIN}$ is constant for each interval I1, I2, I3, I4, I0, I5 and is the same as the difference between the maximum value $I^*_{MAX}$ and the minimum value $I^*_{MAX}$ of each range I1*, I2*, I3*, I0*, I4*, I5*.

The maximum value $I_{MAX}$ of each range I1, I2, I3, I4, I0, I5 is greater than the maximum value $I^*_{MAX}$ of the corresponding range I1*, I2*, I3*, I0*, I4*, I5*.

The minimum value $I_{MIN}$ of each range I1, I2, I3, I4, I0, I5, I6 is greater than the minimum value $I^*_{MIN}$ of the corresponding range I1*, I2*, I3*, I0*, I4*, I5*, I6*.

The difference between the maximum value $I_{MAX}$ of each range I1, I2, I3, I4, I0, I5 and the maximum value $I^*_{MAX}$ of the corresponding range I1*, I2*, I3*, I0*, I4*, I5* is constant and is the same as the difference between the minimum value $I_{MIN}$ of each range I1, I2, I3, I4, I0, I5, I6 and the minimum value $I^*_{MIN}$ of the corresponding range I1*, I2*, I3*, I0*, I4*, I5*, I6*.

In this way, the ranges I1, I2, I3, I4, I0, I5, I6 are offset by a constant value relative to the corresponding ranges I1*, I2*, I3*, I0*, I4*, I5*, I6*.

In particular, the control unit 20 operates the heating elements 32 with a temperature and for an amount of time that are such as to cause the temperature $T_{utenza}$ of the steering wheel 15c to be the same as an objective temperature T4obj.

The control unit 20 is further programmed to receive, from the sensor 51, the current value of the temperature $T_{utenza}$ of the steering wheel 15c and to activate/deactivate the heating elements 32 through feedback.

The storing stage 21 stores a map 26 and the objective temperature T4obj.

The map 26 associates, in particular (FIG. 3):

an open range J1 of values of the temperature $T_{prev}$ that are smaller than or equal to the temperature $T_{soglia}$ at the ON operating level of the system 24, in case of progressively increasing values of the temperature $T_{prev}$; and an open range J1* of values of the temperature $T_{prev}$ that are smaller than or equal to the value $T_{soglia}$* at the OFF operating level of the system 24, in case of progressively decreasing values of the temperature value $T_{prev}$.

In particular, the temperature $T_{soglia}$* is lower than the temperature $T_{soglia}$.

The motor vehicle 1 further comprises (FIG. 2):

a sensor 80 configured to detect the presence of a passenger on the seat 15a; and a sensor 85 configured to detect the presence of a passenger on the seat 15b.

The control unit 20 is connected to the sensors 80, 85 and is programmed to:

operate the system 23 associated with the seats 15a, 15b, only if the relative sensor 80, 85 has detected the presence of the passenger; and operate the system 24 associated with the steering wheel 15c, only if the sensor 80 has detected the presence of the passenger.

In use, the sensor 10 detects the external temperature $T_{out}$ on the outside of the passenger compartment 3 of the motor vehicle 1 and the sensor 14 detects the current value of the temperature $T_{cabina}$ inside the passenger compartment 3.

The sensors 50, 51 detect the current temperature $T_{utenza}$ of the seats 15a, 15b and of the steering wheel 15c.

The passengers set the temperature $T_{richiesta}$ inside the passenger compartment 3 through the interface 8 of the conditioning system 7.

Consequently, the conditioning system 7, in a known manner, which is not described herein for it is not deemed necessary for the comprehension of the invention, supplies air at a temperature that is higher or lower than the temperature $T_{cabina}$, so as to adjust the temperature $T_{cabina}$ inside the passenger compartment 3 based on the temperature $T_{richiesta}$.

In case the sensor 80 detects the presence of the passenger of the passenger compartment 3 on the seat 15a, the control unit 20 operates the system 23 for adjusting the temperature of the seat 15a and the system 24 for adjusting the temperature of the steering wheel 15c.

On the other hand, in case the sensor 80 does not detect the presence of any passenger on the seat 15a, the control unit leaves the system 23 for adjusting the temperature of the seat 15a and the system 24 deactivated.

Similarly, in case the sensor 80 detects the presence of the passenger of the passenger compartment 3 on one of the seats 15b, the control unit 20 operates the system 23 for adjusting the temperature of said seat 15b.

On the other hand, in case the sensor 80 does not detect the presence of any passenger on one of the seats 15b, the control unit leaves the system 23 for adjusting the temperature of said seat 15b deactivated.

More in detail, the control unit 20 processes the value of the parameters α, β based on the temperature $T_{out}$.

Furthermore, the control unit 20 processes the temperature $T_{prev}$ based on the temperatures $T_{utenza}$, $T_{cabina}$ and $T_{richiesta}$ according to the following formula:

$$Tprev = \alpha * Tutenza + \beta * Tcabina + \gamma * (TRIF - Trichiesta),$$

The control unit 20 further detects the increasing or decreasing time development of the temperature $T_{prev}$.

In case the temperature $T_{prev}$ increases over time, the control unit 20 associates the temperature $T_{prev}$ with one of the ranges I1, I2, I3, I0, I4, I5, I6 and assesses whether the temperature $T_{prev}$ is lower or higher than the temperature $T_{soglia}$.

In case the temperature $T_{prev}$ increases over time, the control unit 20 associates the temperature $T_{prev}$ with one of the ranges I1*, I2*, I3*, I0*, I4*, I5*, I6* and assesses whether the temperature $T_{prev}$ is lower or higher than $T_{soglia}$*.

The control unit 20 identifies a level L1, L2, L3, L0, L4, L5, L6 associated with the range I1, I2, I3, I0, I4, I5, I6; I1*, I2*, I3*, I0*, I4*, I5*, I6* corresponding to the temperature $T_{prev}$.

The control unit 20 has the systems 23 associated with the seats 15a, 15b operate the heating elements 30, in case the identified level is L1, L2, L3, or the cooling elements 31, in case the identified level is L4, L5, L6.

In case the identified level is L1, L2, L3, the control unit 20 operates the resistances 40 of the heating elements 30 with a temperature and for an amount of time that are necessary to cause the temperature $T_{utenza}$ of the seat 15a, 15b to be the same as the objective temperature T1obj, T2obj, T3obj. This determines a progressive increase in $T_{prev}$.

Following the variation of the temperatures $T_{out}$, $T_{cabina}$ and $T_{utenza}$, the following level L2, L3 is progressively identified, until the level L10 is reached. At this point, the control unit 20 orders the systems 23 to not operate the heating elements 30 or the cooling elements 31, since the temperature $T_{utenza}$ of the seat 15a, 15b corresponds to the condition of comfort of the passenger of the seat 15a, 15b.

Similarly, in case the identified level is L6, L5, L4, the activation of the fans 41 of the cooling elements 31 with corresponding levels of angular speed ω of the fans 41 determines a decrease in the temperature $T_{utenza}$ of the seat 15a, 15b and, consequently, a progressive decrease in $T_{prev}$.

Following the variation of the temperatures $T_{out}$, $T_{cabina}$ and $T_{utenza}$, the following level L5, L4 is progressively identified, until the level L10 is reached. At this point, the control unit 20 orders the systems 23 to not operate the heating elements 30 or the cooling elements 31, since the temperature $T_{utenza}$ of the seat 15a, 15b corresponds to the condition of comfort of the passenger of the seat 15a, 15b.

With reference to the steering wheel 15c, in case the temperature $T_{prev}$ is lower than the temperature $T_{soglia}$, in case of increasing temperature $T_{prev}$, or than the temperature $T_{soglia}$*, in case of decreasing temperature $T_{prev}$, the control unit 20 sets the system 24 to the ON condition, in which the resistances 42 of the heating elements 32 are activated.

More in particular, the control unit 20 operates the resistances 42 of the heating elements 30 with a temperature and for an amount of time that are necessary to cause the temperature $T_{utenza}$ of the steering wheel 15c to be the same as the corresponding objective temperature T4obj.

This determines an increase in the temperature $T_{utenza}$ of the steering wheel 15c and, hence, in the temperature $T_{prev}$, until the temperature $T_{prev}$ exceeds the temperature $T_{soglia}$, in case of increasing temperature $T_{prev}$, or the temperature $T_{soglia}$*, in case of decreasing temperature $T_{prev}$.

At this point, the control unit 20 sets the system 24 to the OFF condition, in which the heating elements 32 are deactivated, since the temperature $T_{utenza}$ of the steering wheel 15c corresponds to the relative comfort value.

The disclosure above reveals evident advantages that can be obtained with the invention.

In particular, the control unit 20 is programmed to:

process a temperature $T_{prev}$ based on the temperatures $T_{utenza}$, $T_{cabina}$, $T_{richiesta}$; and have the systems 23, 24 heat/cool the seats 15a, 15b and/or the steering wheel 15c based on the temperature $T_{prev}$.

In this way, the temperature $T_{utenza}$ of the seats 15a, 15b and of the steering wheel 15c is adjusted based on the temperature $T_{prev}$ and, hence, also based on the temperature $T_{richiesta}$ requested by the passenger of the passenger compartment 3 and on the temperatures $T_{cabina}$, $T_{utenza}$ perceived by the aforesaid passenger.

This significantly increases the passengers' comfort compared to known solution identified in the introduction to the description.

The control unit 20 is further programmed to operate the systems 23, 24 only when the sensor 80, 85 detects the presence of the passenger on the respective seat 15a, 15b.

This reduces the energy consumptions associated with the air conditioning of the motor vehicle 1, nevertheless maximizing the thermal comfort perceived by the passengers of the motor vehicle 1.

The maximum value $I_{MAX}$ of each range I1, I2, I3, I4, I0, I5 is greater than the maximum value $I*_{MAX}$ of the corresponding range I1*, I2*, I3*, I0*, I4*, I5*.

The minimum value $I_{MIN}$ of each range I2, I3, I4, I0, I5, I6 is greater than the minimum value $I*_{MIN}$ of the corresponding range I2*, I3*, I0*, I4*, I5*, I6*.

Similarly, the temperature $T_{soglia}$ of the range J1 is greater than the temperature $T_{soglia}$ of the interval J1*.

In this way, the maps 25, 26 feature a constant deviation—indicated in FIG. 4 as fixed hysteresis—between the ranges I1, I2, I3, I4, I0, I5, I6, J1 concerning decreasing temperatures $T_{prev}$ and the corresponding ranges I1*, I2*, I3*, I0*, I4*, I5*, I6*, J1* concerning decreasing temperatures $T_{prev}$.

Said hysteresis compensate for possible hysteresis errors of the sensors 10, 15, 50, 51.

The objective temperatures T1obj, T2obj, T3obj associated with the levels I1, I2, I3 are identical to respective temperatures T1, T2, T3 of the seat 15a, 15b that can be selected by means of the manual interface 12.

In this way, the control unit 20 automatically controls the heating elements 30 so as to give the passenger on the seat 15a, 15b a feeling of comfort that is substantially identical to the one that he/she would obtained by manually acting upon the interface 12.

Finally, the method and the motor vehicle 1 according to the invention can be subjected to changes and variations, which, though, do not go beyond the scope of protection set forth in the appended claims.

In particular, the system 24 for adjusting the temperature of the steering wheel 15a and, more in general, of any element to be interfaced with the passenger of the passenger compartment 3, other than the seat 15a, 15b, could be similar to the system 23 and be controlled by the control unit 20 similarly to the system 23.

In other words, the system 24 could comprise heating elements and cooling elements similar to the heating elements 30 and to the cooling elements 31, respectively; and the control unit 20 could be programmed to control the heating elements and the cooling elements of the system 24 according to a plurality of discrete levels similar to the levels L1, L2, L3, L0, L4, L5, L6; and the storing stage 21 could contain a map for controlling the heating elements and the cooling elements of the system 24 similar to the map 25.

The heating elements 31 could be other than the electrical resistances 40 and the cooling elements 31 could be other than the fans 41.

The invention claimed is:

1. A method to adjust a first temperature (Tutenza) of an element comprising at least one of a seat (15a, 15b) and a steering wheel (15c) of a motor vehicle (1) to be interfaced with a passenger of the motor vehicle (1), comprising the steps of:

i) adjusting a second temperature (Tcabina) on the inside of a passenger compartment (3) of said motor vehicle (1) based on a third temperature (Trichiesta) currently requested to an adjustment system comprising heating means (23), cooling means (24), and an interface (12) which can manually be operated and is operatively connected to said heating means (23) and cooling means (24) for said second temperature (Tcabina) itself;

ii) detecting a fourth external temperature (Tout) on the outside of a passenger compartment (3) of said motor vehicle (1); and iii) detecting a current value of said second temperature (Tcabina) on the inside of said passenger compartment (3) of said motor vehicle (1);

iv) detecting a current value of the first temperature (Tutenza) of said element (15a, 15b, 15c);

v) processing a fifth temperature (Tprev) based on said first, second and third temperature (Tutenza; Tcabina; Trichiesta); and vi) exchanging a heat power with said element (15a, 15b, 15c) so as to adjust said first temperature (Tutenza) based on said fifth temperature (Tprev);

said step v) comprising the step vii) of processing said fifth temperature (Tprev) also based on said fourth temperature (Tout);

characterized in that said step vii) comprises the step viii) of processing said fifth temperature (Tprev) based on the following formula:

$$Tprev = \alpha * Tutenza + \beta * Tcabina + \gamma * (TRIF - Trichiesta),$$

wherein:

TRIF is a sixth reference temperature that can selectively be set;

$\alpha$ and $\beta$ are coefficients that depend on said fourth temperature (Tout) and are independent of said first, second and third temperature (Tutenza; Tcabina; Trichiesta); and $\gamma$ is a constant coefficient.

2. The method according to claim 1, characterized in that said step vi) comprises the steps of:

ix) controlling heating means (23) and cooling means (24) of said element (15a, 15b, 15c) according to discrete operating levels (L1, L2, L3, L0, L4, L5, L6; ON, OFF); and x) associating at least one level (L1, L2, L3, L0, L4, L5, L6; ON, OFF) with a first open or closed range of values of said fifth temperature (Tprev).

3. The method according to claim 2, characterized in that said step x) comprises the steps of:

xi) associating at least one level (L1, L2, L3, L0, L4, L5, L6; ON, OFF) with a first range (I1, I2, I3, I0, I4, I5, I6; J1, J2) of values of said fifth temperature (Tprev), when said fifth temperature (Tprev) increases; and xii) associating said at least one level (L1, L2, L3, L0, L4, L5, L6; ON, OFF) with a second range (I1*, I2*, I3*, I0*, I4*, I5*, I6*; J1*, J2*) of values of said fifth temperature (Tprev)*, when said fifth temperature (Tprev) decreases;

said first range (I1, I2, I3, I0, I4, I5, I6; J1, J2) comprising at least one first end value (Imin, Imax; Tsoglia) and said second range (I1*, I2*, I3*, I0*, I4*, I5*, I6*; J1*, J2*) comprising at least one second end value (I*min, I*max; Tsoglia*), which is different from said at least one first end value (Imin, Imax; Tsoglia).

4. The method according to claim 3, characterized in that:

said first range (I1, I2, I3, I0, I4, I5) is closed and comprises, in turn, a third end value (Imin), which is smaller than said first end value (Imax); and said second range (I1*, I2*, I3*, I0*, I4*, I5*) is closed and comprises, in turn, a fourth end value (I*min), which is smaller than said second end value (I*max);

said second end value (I*max) being smaller than said first end value (Imax);

said fourth end value (I*min) being smaller than said third end value (Imax).

5. The method according to claim 2, characterized in that said step x) comprises the steps of:

xiii) operating said heating means (23) according to respective levels (L1, L2, L3) corresponding to respective seventh objective temperatures (T1obj, T2obj, T3obj; T4obj) to be reached and maintained by said element (15a, 15b; 15c); and/or xiv) operating said cooling means (24) according to respective levels (L4, L5, L6) corresponding to respective angular speed values (ω) of fans (41) of the cooling means (24).

6. The method according to claim 1, characterized in that said element (15a, 15b, 15c) is a first seat (15b) or a steering wheel (15c) associated with a second seat (15a), which is distinct from or coincides with said first seat (15b), and in that it comprises the steps of:

xv) detecting the presence or absence of said passenger of said first seat (15b) or on said second seat (15b);

said step vi) comprising the steps of:

xvi) adjusting said first temperature (Tutenza) of said first seat (15b) only if the presence of said passenger on said first seat (15b) was detected; and vii) adjusting said first temperature (Tutenza) of said second seat (15a) and of said steering wheel (15c) only if the presence of said passenger of said second seat (15a) was detected.

7. A motor vehicle (1) comprising:

a body (2) defining a passenger compartment (3);

an adjustment system comprising a conditioning system (7) for a first temperature (Tcabina) inside said passenger compartment (3), the conditioning system (7) comprising a plurality of air vents (9);

a control unit (20) designed to control said adjustment system for the first temperature (Tcabina) inside said passenger compartment (3) and by means of which a second temperature (Trichiesta) requested inside said passenger compartment (3) can be set;

a first sensor (10) configured to detect a third external temperature (Tout) on the outside of a passenger compartment (3) of said motor vehicle (1);

a second sensor (14) configured to detect a current value of said first temperature (Tcabina) on the inside of said passenger compartment (3) of said motor vehicle (1);

at least one element to be interfaced with a passenger of said motor vehicle (1), the at least one element comprising at least one of a seat (15a, 15b) and a steering wheel (15c); and adjustment means (23, 24) for a fourth temperature (Tutenza) of said element (15a, 15b, 15c) to be interfaced, which can be operated in order to exchange a heat power with said element (15a, 15b, 15c) and adjust said fourth temperature (Tutenza), the adjustment means (23, 24) comprising a plurality of heating elements (30) comprising electrical resistances (40) and a plurality of cooling elements (31) comprising fans (41);

a third sensor (50, 51) configured to detect a current value of the fourth temperature (Tutenza) of said element (15a, 15b, 15c); and the control unit (20) programmed to:

process a fifth temperature (Tprev) based on said fourth, first and second temperature (Tutenza; Tcabina; Trichiesta); and generate, based on said fifth temperature (Tprev), a command for said adjustment means (23, 24) so as to adjust said fourth temperature (Tutenza);

said control unit (20) being programmed to process said fifth temperature (Tprev) also based on said third external temperature (Tout);

characterized in that said control unit (20) is programmed to process said fifth temperature (Tprev) based on the following formula:

$$Tprev = \alpha * Tutenza + \beta * Tcabina + \gamma * (TRIF - Trichiesta),$$

wherein:

TRIF is a sixth temperature that can selectively be set by said passenger;

$\alpha$ and $\beta$ are coefficients that depend on said third temperature (Tout) and are independent of said fourth, first and second temperature (Tutenza; Tcabina; Trichiesta); and $\gamma$ is a constant coefficient.

8. The motor vehicle according to claim 7, characterized in that said control unit (20) comprises a storing stage (21) comprising a physical memory, which stores discrete operating levels (L1, L2, L3, L0, L4, L5, L6; ON, OFF) of said adjustment means (23, 24), which are associated with respective open (I6, I6*; J1, J1*) or closed ranges (I1, I2, I3, I0, I4, I5; I1*, I2*, I3*, I0*, I4*, I5*) of said fifth temperature (Tprev).

9. The motor vehicle according to claim 8, characterized in that said storing stage (21) is programmed to store:

at least one first closed range (I1, I2, I3, I0, I4, I5) and one first open range (I6) of values of said fifth temperature (Tprev), when said fifth temperature (Tprev) increases; and at least one second closed range (I1*, I2*, I3*, I0*, I4*, I5*) and one second open range (I6*) of values of said fifth temperature (Tprev), when said fifth temperature (Tprev) decreases;

said first closed range (I1, I2, I3, I0, I4, I5) comprising at least one first end value (Imin, Imax) and said second closed range (I1*, I2*, I3*, I0*, I4*, I5*) comprising at least one second end value (I*min, I*max), which is different from said first end value (Imin, Imax);

said first closed range (I1, I2, I3, I0, I4, I5) comprising a third end value (Imin), which is smaller than said first end value (Imax);

said second closed range (I1*, I2*, I3*, I0*, I4*, I5*) further comprising a fourth end value (I*min), which is smaller than said second end value (I*max);

said second end value (I*max) being smaller than said first end value (Imax);

said fourth end value (I*min) being smaller than said third end value (Imax);

said element (15a, 15b, 15c) being a seat (15a, 15b).

10. The motor vehicle according to claim 8, characterized in that said storing stage (21) is programmed to store:

at least one third open range (J1) of values of said fifth temperature (Tprev), when said fifth temperature (Tprev) increases; and at least one fourth open range (J1*) of values of said fifth temperature (Tprev), when said fifth temperature (Tprev) decreases;

said third range (J1) being delimited by a seventh maximum temperature (Tsoglia);

said fourth range (J1*) being delimited by an eighth maximum temperature (Tsoglia*), which is smaller than said seventh maximum temperature (Tsoglia);

said element (15a, 15b, 15c) being a steering wheel (15c).

11. The motor vehicle according to claim 8, characterized in that said discrete levels (L1, L2, L3; J1) are operating levels of electric resistances (40; 42) of said adjustment means (23; 24) and correspond to respective ninth temperatures (T1obj, T2obj, T3obj; T4obj) to be reached and maintained by said element (15a, 15b; 15c);

and in that said discrete levels (L4, L5, L6) are operating levels of fans (41) of said cooling means (24) and correspond to respective angular speed values (@) of said fans (41).

12. The motor vehicle according to claim 7, characterized in that said element (15a, 15b, 15c) is a first seat (15a) or a steering wheel (15c), and in that it comprises a second seat (15b), which is distinct from or coincides with said first seat (15a);

said motor vehicle (1) further comprising a fourth sensor (80), which is designed to detect the presence or absence of said passenger of said first seat (15a), and a fifth sensor (85), which is designed to detect the presence or absence of said passenger of said second seat (15b);

said control unit (20) being programmed to:

adjust said fourth temperature (Tutenza) of said first seat (15a) and of said steering wheel (15c) only if said fourth sensor (80) detected, in use, the presence of said passenger of said first seat (15a); and/or adjust said fourth temperature (Tutenza) of said second seat (15b) only if the fourth sensor (85) detected, in use, the presence of said passenger on said second seat (15b).

13. The motor vehicle according to claim 10, further characterized in that said interface (12) is configured so as to allow a plurality of progressively increasing tenth temperatures (T1, T2, T3) of said element (15a, 15b, 15c) to be set; said tenth temperatures (T1, T2, T3) being equal to respective ninth temperatures (T1obj, T2obj, T3obj; T4obj) to be reached and maintained by said element (15a, 15b).

14. A computer product loadable into a control unit (20) and designed, when it is executed, to implement the steps of a method according to claim 1.

* * * * *